(12) United States Patent
Farkas et al.

(10) Patent No.: US 9,372,706 B2
(45) Date of Patent: *Jun. 21, 2016

(54) HOST SELECTION FOR VIRTUAL MACHINE PLACEMENT

(71) Applicant: VMware, Inc., Palo Alto, CA (US)

(72) Inventors: Keith Farkas, San Carlos, CA (US); Guoqiang Shu, San Jose, CA (US); Minwen Ji, Los Altos, CA (US); Ganesha Shanmuganathan, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/318,141

(22) Filed: Jun. 27, 2014

(65) Prior Publication Data

US 2014/0317620 A1    Oct. 23, 2014

Related U.S. Application Data

(63) Continuation of application No. 13/089,123, filed on Apr. 18, 2011, now Pat. No. 8,806,484.

(51) Int. Cl.
*G06F 9/455* (2006.01)
*G06F 9/50* (2006.01)

(52) U.S. Cl.
CPC ........ *G06F 9/45533* (2013.01); *G06F 9/45558* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,904,540 B2 | 3/2011 | Hadad et al. | |
| 7,912,955 B1 | 3/2011 | Machiraju et al. | |
| 8,234,641 B2 | 7/2012 | Fitzgerald et al. | |
| 8,423,998 B2 * | 4/2013 | Isci | G06F 9/5077 717/176 |
| 8,464,267 B2 * | 6/2013 | Uyeda | G06F 9/5044 718/1 |
| 2007/0250833 A1 | 10/2007 | Araujo, Jr. et al. | |
| 2007/0271560 A1 | 11/2007 | Wahlert et al. | |
| 2009/0070771 A1 | 3/2009 | Yuyitung et al. | |
| 2010/0281478 A1 | 11/2010 | Sauls et al. | |
| 2011/0214122 A1 | 9/2011 | Lublin et al. | |
| 2011/0231696 A1 | 9/2011 | Ji et al. | |

* cited by examiner

*Primary Examiner* — Van Nguyen

(57) ABSTRACT

In one embodiment, a method for placing virtual machines in a collection is provided. A plurality of equivalence sets of hosts is determined prior to placing virtual machines in the collection. The hosts in an equivalence set of hosts are considered similar. An equivalence set of hosts in the plurality of equivalence sets is selected to place the virtual machines in the collection. The method then places at least a portion of the virtual machines in the collection on one or more hosts in the selected equivalence set of hosts.

18 Claims, 7 Drawing Sheets

HOST SELECTION FOR VIRTUAL MACHINE PLACEMENT

CROSS-REFERENCE TO RELATED APPLICATION

This application is a Continuation of U.S. application Ser. No. 13/089,123, filed Apr. 18, 2011 and issued as U.S. Pat. No. 8,806,484 on Aug. 12, 2014.

BACKGROUND

Virtual machines (VMs) in a collection may need to be placed on hosts. For example, placement may occur when a request to power on virtual machines in the collection is received. A placement engine may determine host assignments based on a set of constraints. For example, using a fault-tolerance (FT) policy, a placement engine needs to place a primary virtual machine and one or more secondary virtual machines on different hosts. The hosts on which the primary virtual machine and the secondary virtual machines are placed should be similar hosts where the hosts are not only compatible with all the virtual machines in the collection but also share a common set of attributes.

For example, in fault-tolerance, a primary virtual machine is placed on a first host. To provide fault-tolerance, a secondary virtual machine is placed on a different host (e.g., a second host). Further, if other secondary virtual machines exist, the other secondary virtual machines are each placed on a separate host different from the first host and the second host. Thus, if a first host fails, then one of the hosts that includes a secondary virtual machine may be used.

The Virtual machines in the collection should be placed on similar hosts with a common set of attributes. For example, the virtual machines in the collection may be using a cluster of pooled resources. The cluster may include hosts that include different attributes. For example, a cluster may have four hosts, two hosts with a first type of computer processor and two hosts with a second type of computer processor. If a primary virtual machine and secondary virtual machine are to be placed, a constraint may be that the primary virtual machine and secondary virtual machine be placed on either the first type of computer processors or the second type of computer processors. That is, it is invalid to place the primary virtual machine on a host including the first type of processor and then place the secondary virtual machine on a host including the second type of computer processor.

In one example, a placement engine may select a host for the primary virtual machine. After placing the first virtual machine, the placement engine does not know which hosts in the cluster would appropriate for placing the secondary VM to meet the constraints. Thus, the placement engine might select an incompatible host for the secondary virtual machine. If this occurs, then a second placement attempt may be performed. For example, the placement engine may select another host for the secondary virtual machine. This process continues until the placement engine selects a host that satisfies the constraints. For example, if the primary virtual machine is placed on a first host with the first type of computer processor, the placement engine places the secondary virtual machine on hosts until a second host with the first type of computer processor is selected. This may result in multiple placement attempts, which is inefficient, distracts from a goal of a user who wants the virtual machines placed, and may produce misleading error messaging.

Another solution may place the primary virtual machine on a first host. Then, a set of hosts that is similar to the first host is determined. A secondary virtual machine can be placed on one of the determined set of hosts. This, however, requires that the placement engine place the primary virtual machine on the first host before determining the set of hosts. Thus, if the placement of the primary virtual machine is on a host that belongs to a non-optimal set of hosts, the placement may not be ideal. For example, a second set of hosts may have more resources available, but the virtual machines in the collection are not placed on those hosts because the primary virtual machine was first placed on a host associated with a different set of hosts, and thus some or all of the secondary virtual machines may not be placed.

SUMMARY

In one embodiment, a method for placing virtual machines in a collection is provided. A plurality of equivalence sets of hosts is determined prior to placing virtual machines in the collection. The hosts in an equivalence set of hosts are considered similar. An equivalence set of hosts in the plurality of equivalence sets is selected to place the virtual machines in the collection. The method then places at least a portion of the virtual machines in the collection on one or more hosts in the selected equivalence set of hosts.

In one embodiment, determining the plurality of equivalence sets of hosts includes using a symmetry property to determine the plurality of equivalence sets of hosts.

In one embodiment, determining the plurality of equivalence sets of hosts includes using a transitivity property to determine the plurality of equivalence sets of hosts.

In one embodiment, the method includes testing at least a portion of the plurality of equivalence sets of hosts, wherein a test of an equivalence set of hosts determines a number of virtual machines in the collection that can be placed on hosts in the equivalence set of hosts. An equivalence set of hosts is selected based on the testing.

In another embodiment, a method includes determining a compatible set of hosts for virtual machines in a collection based on a compatibility function. The compatible set of hosts includes hosts in which a first virtual machine and a second virtual machine in the collection are considered compatible. The method determines a plurality of equivalence sets of hosts prior to placing any of the virtual machines in the collection based on a similarity function. The equivalence set of hosts includes hosts that are similar. The method selects an equivalence set of hosts to place the first virtual machine and the second virtual machine. The first virtual machine is placed on a first host in the selected equivalence set of hosts. The second virtual machine is placed on a second host in the selected equivalence set of hosts.

In one embodiment, a non-transitory computer-readable storage medium containing instructions for placing virtual machines in a collection is provided, the instructions for controlling a computer system to be operable to: determine a plurality of equivalence sets of hosts prior to placing virtual machines in the collection, wherein hosts in an equivalence set of hosts are considered similar; select an equivalence set of hosts in the plurality of equivalence sets to place the virtual machines in the collection; and place at least a portion of the virtual machines in the collection on one or more hosts in the selected equivalence set of host The following detailed description and accompanying drawings provide a more detailed understanding of the nature and advantages of the present invention.

DETAILED DESCRIPTION

In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
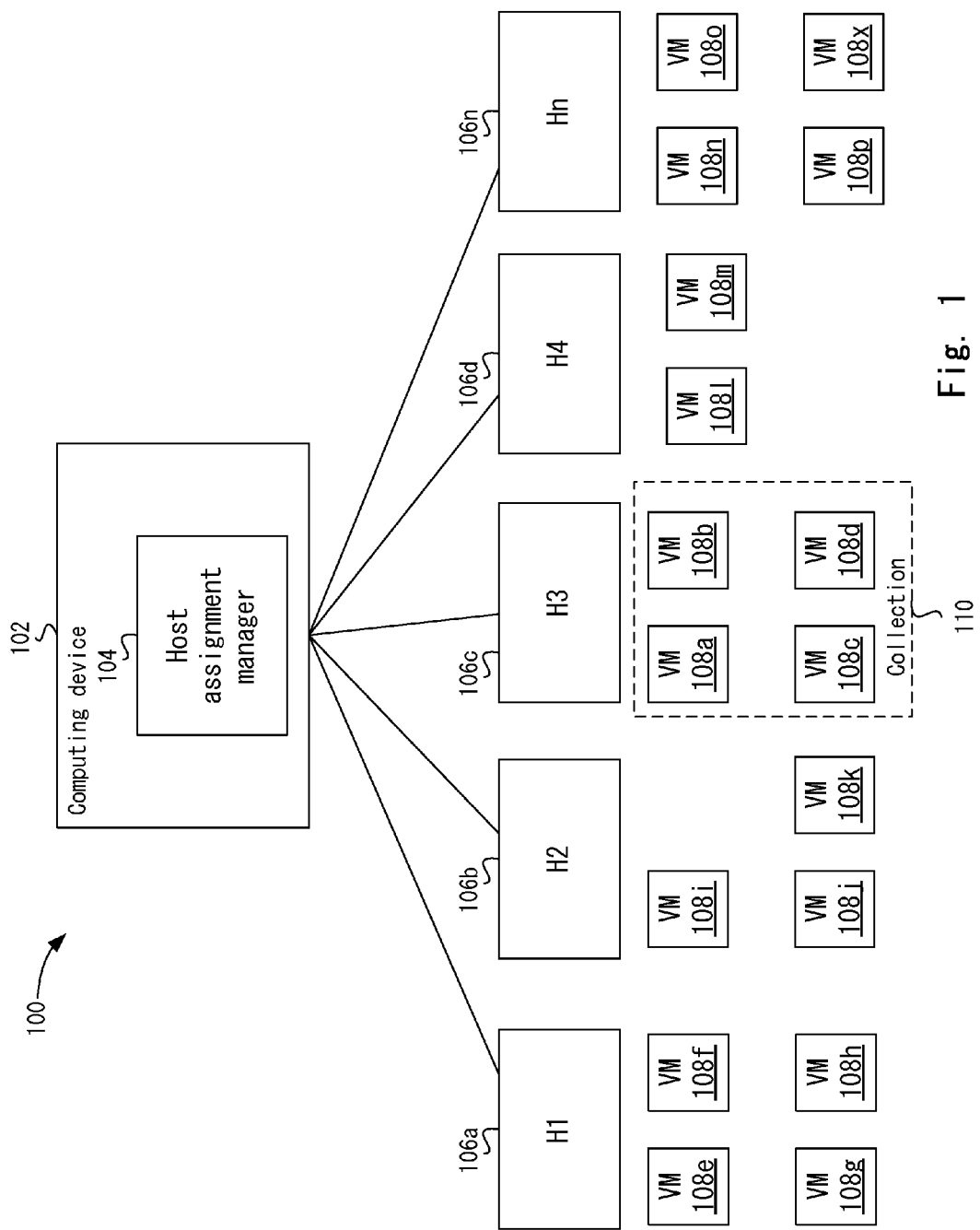
FIG. 1 depicts an example of a system for assigning hosts to virtual machines according to one embodiment.

FIG. 1 depicts an example of a system 100 for assigning hosts to virtual machines according to one embodiment. A computing device 102 includes a host assignment manager 104. Computing device 102 is in communication with a plurality of hosts 106a-106n. Although host assignment 104 is being shown as part of computing device 102, the functions of host assignment manager 104 may be distributed on multiple computing devices or located on hosts 106.

Hosts 106 may be computing devices, such as servers, that may be part of a data center. For example, hosts 106 may be part of a cluster. The cluster may be a group of hosts 106 where the computing resources of the group are pooled. The cluster may be viewed as though the cluster is a single computing device.

Hosts 106 have virtual machines 108 running on them. Virtual machines 108a, 108b, 108c, and 108d are included in a collection 110. Virtual machines 108a-d in collection 110 need to be assigned hosts. For example, virtual machines 108a-d in collection 110 may be currently powered off and need to be powered on. Host assignment manager 104 may then assign hosts 106 to virtual machines 108a-d in collection 110. Although four virtual machines 108a-d are shown, any number of virtual machines 108 may be in collection 110. Also, other virtual machines 108e-x are powered on the respective hosts 106. When the term "virtual machine 108" is referred to in this disclosure, it may be referring to virtual machines of virtual machines 108a-d, virtual machines of virtual machines 108e-x, or virtual machines in both of virtual machines 108a-d and virtual machines 108e-x.

Particular embodiments may power on virtual machines 108a-d in collection 110 on hosts 106. Although powering on virtual machines 108a-d is described, other reasons for placing virtual machines 108a-d on hosts 106 may be appreciated, such as powered on virtual machines 108a-d in collection 110 may be moved to different hosts 106.

Virtual machines 108a-d in collection 110 may have constraints for their placement on hosts 106. For example, the constraints may be virtual machine to host constraints, host to host constraints, and virtual machine to virtual machine constraints. The virtual machine to host constraints may be constraints that require a virtual machine 108 to be compatible with a host 106. The host to host constraints may be constraints that require similarity between hosts 106 in a group. The virtual machine to virtual machine constraints may be constraints between virtual machines that are presently placed on hosts 106, such as a first virtual machine 108a may not be placed on a host 106 that currently has a second virtual machine 108e that is incompatible with the first virtual machine 108a.

The constraints may be tested based on attributes of hosts 106. Hosts 106 may have different or similar attributes. Hosts 106 have attributes, such as computing resources, that may be used by virtual machines 108. For example, hosts 106 may be similar because the hosts have similar computer processor types. Different tests may be used to determine similar or different hosts 106. For example, if a virtual machine 108a-d can be migrated from a first host 106 to a second host 106, the first and second hosts 106 may be considered similar. If not, then the first and second hosts 106 are considered different. Also, virtual machines 108a-d may be compatible with hosts 106 because of the hosts' computer processor type. Tests, such as determining if one of virtual machines 108a-d can be run on a host 106 may be used.

In one embodiment, the constraints may be based on a policy. For example, one policy may be a fault-tolerance (FT) policy. The fault-tolerance policy specifies that a primary virtual machine (e.g., virtual machine 108a) and one or more secondary virtual machines (e.g., virtual machines 108b-d) from collection 110 run on separate hosts 106 that are compatible with all virtual machines 108a-d in collection 110, but also share a common set of attributes. In this case, if a primary virtual machine 108a is placed on a host 106, then one or more secondary virtual machines 108b-d in collection 110 should each be placed on separate hosts 106 that are similar to that on which the primary virtual machine 108a was placed.

Host assignment manager 104 determines a compatible set of hosts 106. These hosts 106 have attributes that match those required by virtual machines 108a-d in collection 110. For example, hosts 106b and 106d may be compatible with virtual machines 108a-d in collection 110 and host 106a may not be compatible with virtual machines in collection 110. In the compatible set, there may be multiple groups of similar hosts 106. For example, a first group may have a first type of processor and a second group may have a second type of processor.

Host assignment manager 104 determines equivalence sets of hosts 106 based on similarity between hosts 106. The equivalence sets are determined before attempting to place virtual machines 108a-d in collection 110. Host assignment manager 104 selects one of the equivalence sets in which virtual machines 108a-d in collection 110 are placed. In one embodiment, the placement is performed for virtual machines 108a-d in collection 110 in the same placement attempt or at the same time. That is, host assignment manager 104 does not place a first virtual machine 108a on a first host and then compute equivalence sets for placing a second virtual machine 108b on another host. Rather, host assignment manager 104 attempts to places virtual machines 108a-d in collection 110 together. By determining the equivalence sets before placing any virtual machines 108a-d in collection 110, the placement process may be efficiently performed because unnecessary placements may be avoided on incompatible hosts 106.

Figure 2:
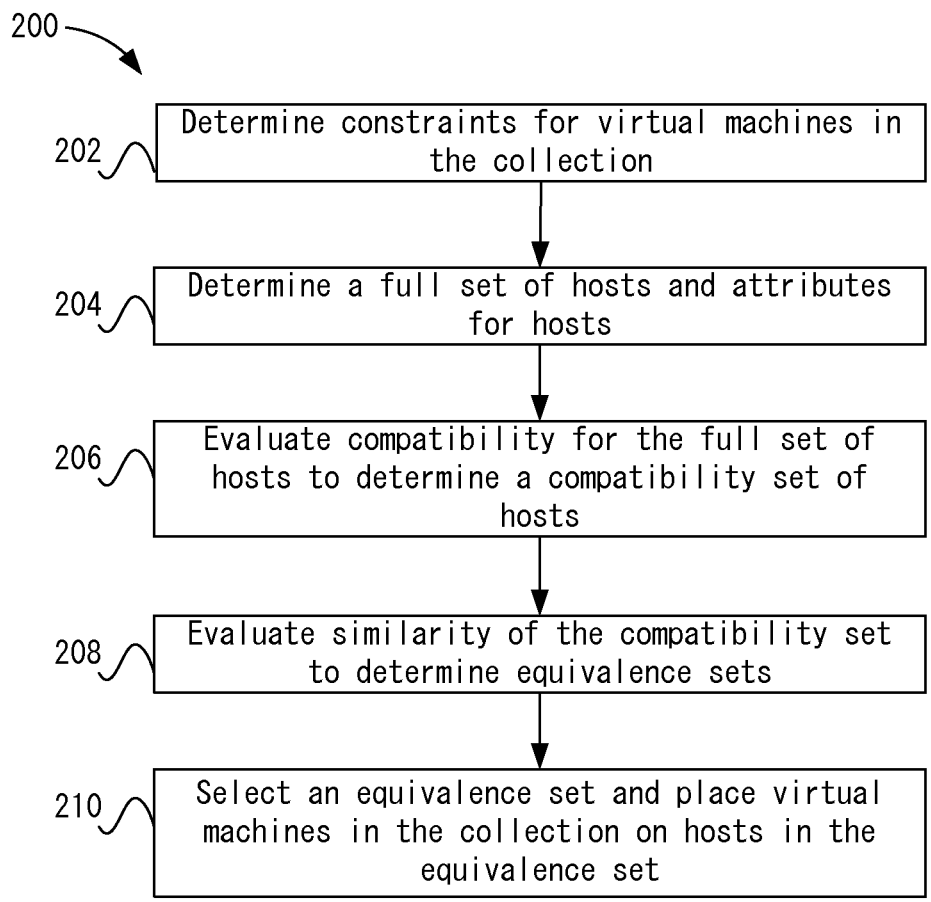
FIG. 2 depicts a simplified flowchart of a method for determining placement of virtual machines in a collection according to one embodiment.

FIG. 2 depicts a simplified flowchart 200 of a method for determining placement of virtual machines 108a-d in collection 110 according to one embodiment. At 202, host assignment manager 104 determines constraints for virtual machines 108a-d in collection 110. For example, virtual machines 108a-d in collection 110 may need to be powered on using a placement policy, such as a fault-tolerance policy. Other policies may also be appreciated, such as a distributed virtual application may need to have virtual machines 108 run on hosts 106 with comparable processor speeds. The constraints of the fault tolerance policy may be based on attributes of virtual machines 108a-d in collection 110 and hosts 106. An example of the constraints is virtual machines 108a-d in collection 110 should be placed on hosts 106 of similar computer processor type and speed.

At 204, host assignment manager 104 determines a full set of hosts 106 and attributes for hosts 106 in the full set of hosts 106. The full set of hosts may be all eligible hosts 106 in which virtual machines 108a-d in collection 110 can possibly be placed. For example, the full set may be all hosts 106 in a cluster. Virtual machines 108a-d in collection 110 may be placed on hosts 106 in the cluster. The attributes for hosts 106 may be stored (e.g., cached) on computing device 102 or may be dynamically received from hosts 106.

At 206, host assignment manager 104 evaluates compatibility for the full set of hosts 106 to determine a compatible set of hosts 106. For example, host assignment manager 104 uses a host compatibility function that evaluates whether a host 106 can be used to place virtual machines 108a-d in collection 110. In one example, if virtual machines 108a-d in collection 110 can be placed on a first type of computer processor and a second type of computer processor, but not a third type of computer processor, hosts 106 that include the first type of computer processor and the second type of computer processor are selected to be in the compatible set while hosts 106 with the third type of processor are not selected to be in the compatible set. In one example, the host compatibility function may include host compatibility checks that are run to assess whether virtual machines 108a-d in collection 110 can be powered on using a given host 106.

In one embodiment, each virtual machine 108a-d in collection 110 may be tested to determine a preliminary compatible set. For example, constraints, such as a computer processor type for each virtual machine 108a-d in collection 110, may be used to determine preliminary compatible sets. Then, hosts 106 in preliminary compatible sets that are compatible for all virtual machines 108 form the final compatible set. Each virtual machine 108a-d in collection 110 may be tested because some virtual machines in virtual machines 108a-d may have different constraints that result in different compatible sets. In other embodiments, a union of preliminary compatible sets may be used, the process of which will be described in more detail below. In another embodiment, virtual machines 108a-d in collection 110 have similar constraints and thus only one virtual machine in virtual machines 108a-d needs to be tested to determine the compatible set.

At 208, host assignment manager 104 evaluates similarity of the compatible set to determine equivalence sets. For example, host similarity may evaluate one or more similarity functions to determine whether it is possible to place a virtual machine 108a from collection 110 on a host H1 if one of virtual machines 108b-d in collection 110 has been placed on a host H2. In one embodiment, the host similarity function includes a set of tests that determines whether a virtual machine 108a can be moved from a host H1 to host H2 after the virtual machine 108a has been powered on. By using these checks, all hosts in an equivalence set may be similar.

The host similarity function that is used may be determined based on the placement policy that is used. For example, different placement policies may dictate which similarity functions would be valid to use. For example, for fault tolerance, the policy requires that the state of a primary virtual machine 108a in collection 110 be copied to secondary virtual machines 108b-d in collection 110. Thus, the similarity function used for the fault tolerance policy tests whether this copying is possible. Since the same tests are performed to determine whether a powered on virtual machine 108 can be moved from one host to another, the similarity function for the fault tolerance policy can thus use the tests that validate whether a powered-on virtual machine 108 can be moved from one host to another. The similarity functions that are used may be designated by a user or may be automatically determined based on the policy used.

In one embodiment, different properties may be applicable that reduce the computational complexity of the testing performed by the host similarity function. For example, a symmetry property or a transitivity property may be used. A user may specify whether the symmetry property or a transitivity property is used based on the placement policy used. In this case, the user may analyze the policy and an input is received from the user indicating which properties may be exploited. In another embodiment, which property can be used may be automatically determined. For example, prior placements (such as those performed at 210) or test placements may be used to exploit the properties. For example, if the host assignment manager 104 determines a host 106 is not actually compatible with hosts 106 in the set, then this fact might be taken into account the next time virtual machines are to be placed.

The symmetry property defines that if the host similarity function for two of virtual machines 108a-d in collection 110 finds that hosts H1 and H2 are similar if one virtual machine 108a was assumed to have been placed on host H1, then the same conclusion is reached if the starting condition is that virtual machine 108a was assumed to have been placed on host H2. That is, a test may place virtual machine 108a on host H1. If the test for host H1 yields that host H2 is similar, then a test where virtual machine 108a is placed on host H2 and tested to determine if host H1 is similar is not needed. Rather, it can be assumed that hosts H1 and H2 are similar and the second test on host H2 is not needed.

The transitivity property defines that if, for example, a virtual machine 108a from collection 110 is assumed to be placed on host H1 and it is determined that hosts H2 and H3 are similar to host H1, then hosts H3 and H1 will be similar if virtual machine 108a was assumed to be placed on host H2 and hosts H1 and H2 will be similar if virtual machine 108a was assumed to be placed on host H3. In this case, if the transitivity property is valid, then another computation will not need to be run to determine that hosts H3 and H1 are similar to host H2 (if the test places virtual machine 108 on host H2) or to determine that hosts H1 and H2 are similar to host H3 (if the test places virtual machine 108a on host H3).

In one embodiment, only one property may be used for a policy. For example, if the policy is to place virtual machines 108a-d in collection 110 on hosts 106 with processor speeds within 50 MHz of each other, the symmetry policy could be used, but not the transitivity policy. This is because a first host H1 has a processing speed of, for example, 200 MHz, a second host H2 has a processing speed of, for example, 250 MHz, and a third host H3 has a processing speed of, for example, 300 MHz. In this case, the first host H1 and the third host H3 do not have processing speeds within 50 MHz of each other and the transitivity property cannot be applied for this policy.

The symmetry property and transitivity property allow host assignment manager 104 to perform fewer computations to determine the equivalence sets. If the symmetry property and transitivity property were not used, then host assignment manager 104 may need to run tests on all hosts for one or more of virtual machines 108*a-d*. Using the above properties, if hosts H1 and H2 are determined to be similar, then a test for similarity on host H2 may not need to be run. This is because, in one embodiment, once a host is part of an equivalence set, then it cannot be part of another equivalence set. Although the symmetry property and transitivity property are described, the symmetry property and transitivity property may not be used and other properties may be appreciated.

At 210, host assignment manager 204 selects an equivalence set and places virtual machines 108*a-d* in collection 110 on hosts 106 in the equivalence set. In one example, an optimal equivalence set is determined, such as an equivalence set in which all the virtual machines 108*a-d* in collection 110 can be placed. The selection and placement process will be described in more detail below.

Figure 3A:
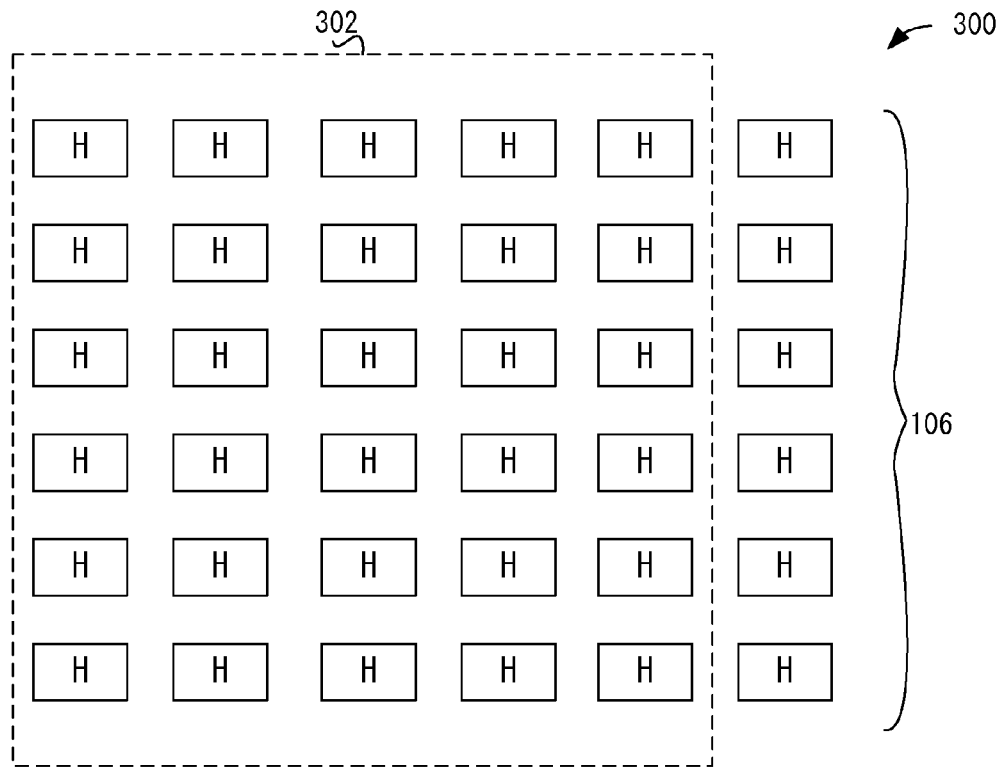
FIG. 3a shows an example of a compatible set according to one embodiment.

FIG. 3*a* shows an example of a compatible set according to one embodiment. A full set of hosts 106 is shown at 300. Host assignment manager 104 uses the compatibility function to determine the compatible set of hosts 106. For example, the compatible set is shown at 302. Equivalence sets are then determined within the compatible set.

Figure 3B:
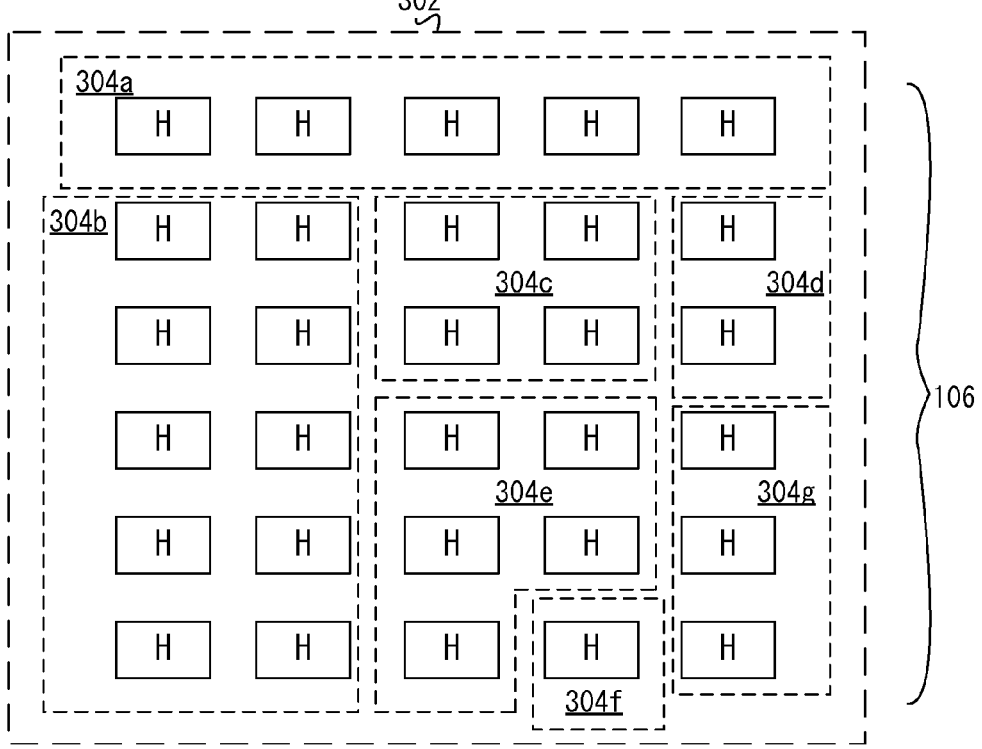
FIG. 3b shows an example of equivalence sets according to one embodiment.

FIG. 3*b* shows an example of equivalence sets according to one embodiment. The compatible set is shown at 302. Different equivalence sets are shown at 304*a*-304*g*. Each equivalence set may include a number of hosts 106. Depending on the result of evaluating the host similarity function, different numbers of equivalence sets may be determined. Also, in one embodiment, there is no overlap among equivalence sets. Rather, once a host 106 is included in an equivalence set, it is not included in another equivalence set.

Figure 4:
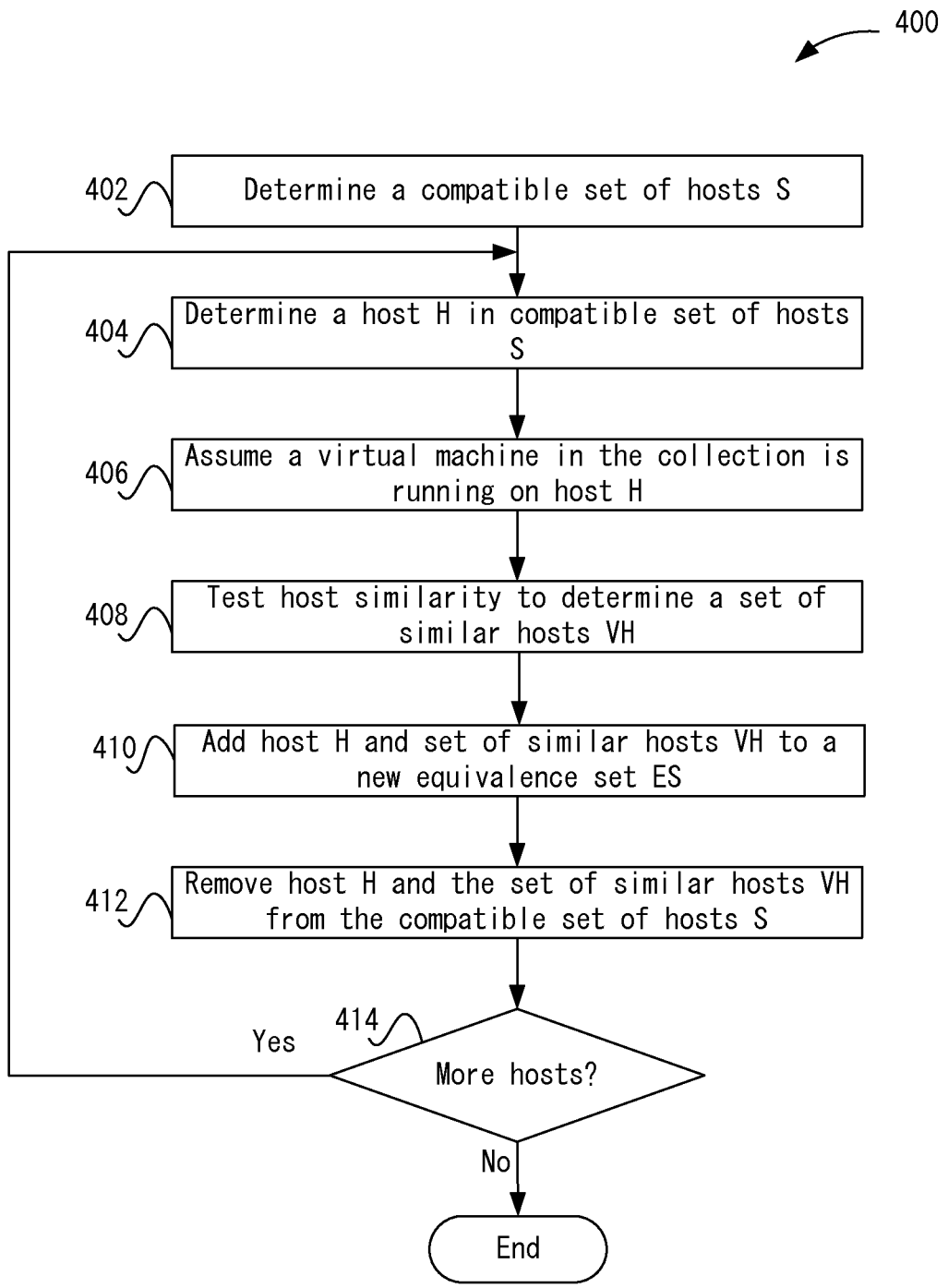
FIG. 4 depicts a simplified flowchart of a method for determining equivalence sets according to one embodiment.

FIG. 4 depicts a simplified flowchart 400 of a method for determining equivalence sets according to one embodiment in which the symmetry and transitivity properties are applicable. At 402, host assignment manager 104 determines a compatible set of hosts S. For example, the host compatibility function may be evaluated to determine hosts 106 that have attributes that are compatible with virtual machines 108*a-d* in collection 110.

At 404, host assignment manager 104 determines a host H in compatible set of hosts S. This may be an arbitrarily selected host H or host H may be selected based on a set of criteria. At 406, for the evaluation, it is assumed one of the virtual machines 108*a-d* in collection 110 is running on host H. At 408, host similarity is tested to determine a set of similar hosts VH. For example, migration tests may be used to determine the set of similar hosts VH for a fault-tolerance (FT) policy.

At 410, host H and set of similar hosts VH are added to a new equivalence set ES. A new equivalence set may be created for each host H that is selected at 404. At 412, host H and the set of similar hosts VH are removed from the compatible set of hosts S. Thus, only hosts that have not been tested or have not been considered similar to one another may be left in the compatible set of hosts S. This ensures that hosts 106 are not members of multiple equivalence sets.

At 414, host assignment manager 104 determines if compatible set of hosts S includes any more hosts. If not, the process ends. In this case, all hosts 106 in the compatible set of hosts S have been included an equivalence set.

If there are more hosts in the compatible set of hosts S, then the process reiterates to 404 where another host H is determined from the compatible set of hosts S. The process continues to determine a new equivalence set ES for this host H.

The following illustrates pseudocode for determining equivalence sets according to one embodiment.

```
Let S be the set of compatible hosts for a VM in the collection
While S is not empty
    Remove an arbitrary host H from the set S
    Assume that the VM is running on host H and compute the
    similarity to the remaining hosts in the set S
    Let VH be the set of similar hosts that result from the
    application of the Host Similarity function plus the host H
    If there is at least two hosts in the set
        Assign hosts in the set VH to a unique host equivalence set
    end if
    Remove these hosts from set S
End while
```

Figure 5:
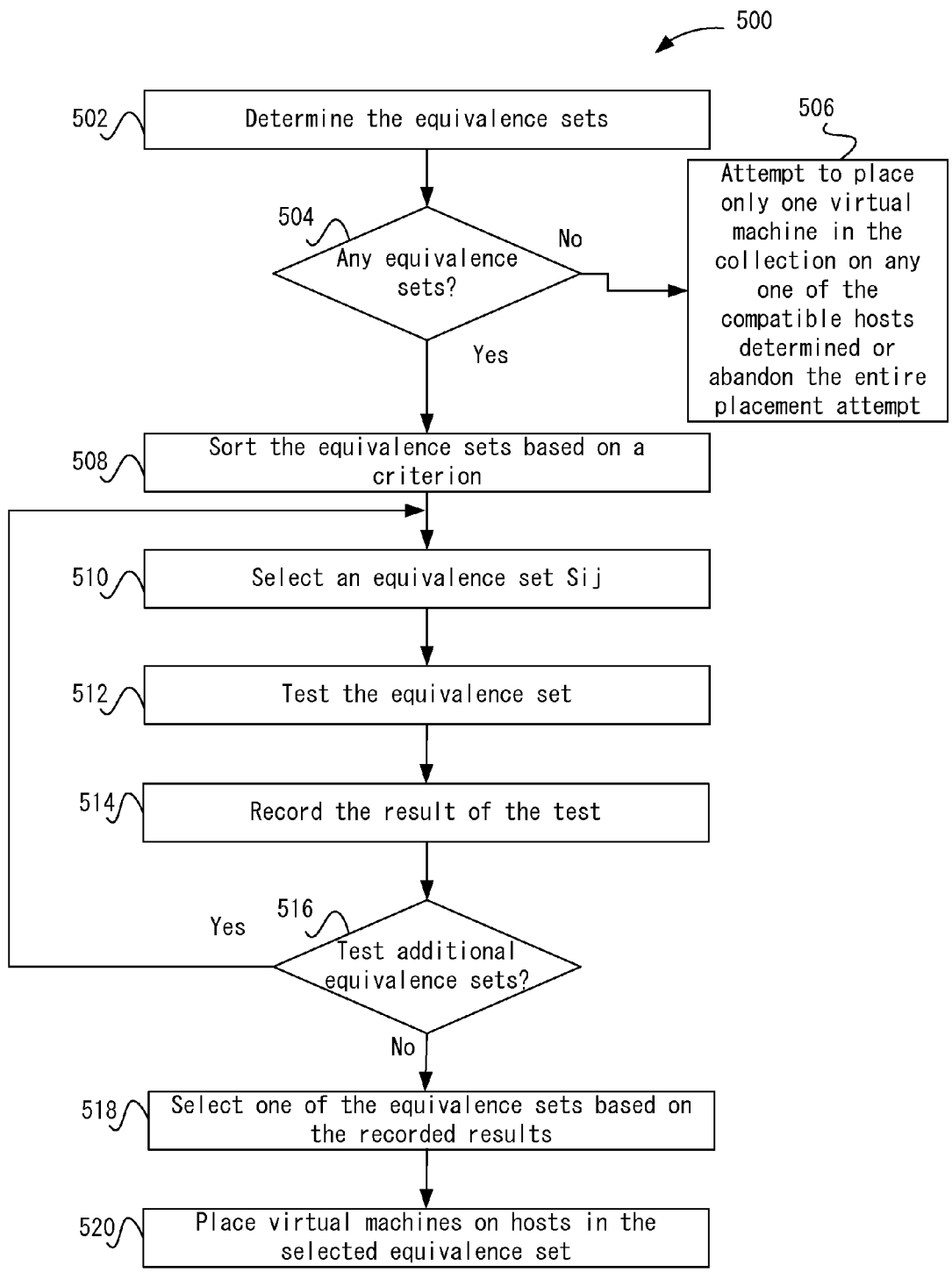
FIG. 5 depicts a simplified flowchart of a method for placing virtual machines in the collection according to one embodiment.

After determining the equivalence sets, host assignment manager 104 then attempts to place virtual machines 108*a-d* in collection 110 on hosts 106 in one of the equivalence sets. FIG. 5 depicts a simplified flowchart 500 of a method for placing virtual machines 108*a-d* in collection 110 according to one embodiment. At 502, host assignment manager 104 determines the equivalence sets. At 504, host assignment manager 104 determines if there are any equivalence sets. No equivalence sets means that no hosts 106 were found to be similar and thus multiple placements of virtual machines 108*a-d* in collection cannot be made. At 506, if there are no equivalence sets, host assignment manager 104 may either attempt to place only one of virtual machines 108*a-d* in collection 110 on any one of the compatible hosts determined or abandon the entire placement attempt.

At 508, if there are equivalence sets, host assignment manager 104 sorts the equivalence sets based on a criterion. For example, the equivalence sets may be sorted from a largest number of hosts 106 to smallest number of hosts 106. The largest equivalence sets (e.g., the equivalence sets that include the most hosts 106) may be tested first because there may be more of a chance that placement of virtual machines 108*a-d* in collection 110 in larger equivalence sets is more likely and hence fewer iterations may not be required. This may become useful if not all equivalence sets are tested because an acceptable equivalence set is found or for some other reason.

At 510, host assignment manager 104 selects an equivalence set Sij. For example, a largest remaining equivalence set may be selected. At 512, host assignment manager 104 tests the equivalence set. For example, the test may be determining if virtual machines 108*a-d* in collection 110 can be placed on hosts 106 in the equivalence set.

In one example, host assignment manager 104 performs a test where theoretical placements of virtual machines 108*a-d* in collection 110 are performed. For example, host assignment manager 104 attempts to place a primary virtual machine 108*a* on a host 106 in the equivalence set. Then, host assignment manager 104 attempts to place one or more secondary virtual machines 108*b-d* on other hosts in the equivalence set. Various factors may affect the placement of virtual machines 108*a-d* in collection 110. For example, anti-affinity rules may not allow placement of one of virtual machines 108*a-d* in collection 110 on a host 106. Anti-affinity rules may specify that certain virtual machines 108 may not be on the same host 106. If host assignment manager 104 attempts to a first virtual machine 108*a* in collection 110 on a host 106, and that host 106 includes an already existing virtual machine 108*e* that invokes anti-affinity, then first virtual machine 108*a* cannot be placed on that host 106. Also, computing resources may affect the placement. If some hosts 106 in the equivalence set do not have enough computing resources for placement of one of virtual machines 108*a-d* in collection 110, then that host 106 may not be used to place that one of virtual machines 108*a-d*. These and other factors may affect the determination of how many virtual machines 108a-d in collection 110 can be placed on hosts 106 in the equivalence set.

At 514, the result of the test is recorded. For example, an indication whether all of virtual machines 108a-d in collection 110 were placed is saved. Other information may be used. For example, if all virtual machines 108a-d in collection 110 were not placed, then if a number of placed virtual machines 108a-d in collection 110 for the equivalence set is greater than a maximum number of placed virtual machines 108a-d in collection 110 for a previous set, then a new maximum number of placed virtual machines 108 (MaxPlacedNum), the current equivalence set (MaxPlacedSet), and the placements of virtual machines 108a-d in collection 110 on which hosts 106 (MaxSetVmPlacement) are recorded.

At 516, it is determined if additional equivalence sets should be tested. For example, all equivalence sets may be tested to determine which equivalence set may be considered to be optimal to place virtual machines 108a-d in collection 110. Also, the testing may be halted after an acceptable equivalence set is determined, such as an equivalence set that allows all virtual machines 108a-d in collection 110 to be placed. If additional equivalence sets should be tested, then the process reiterates to 510 where another equivalence set Sij is selected. The new equivalence set is then tested.

If an additional equivalence set is not going to be tested, then at 518, host assignment manager 104 selects one of the equivalence sets based on the recorded results. For example, different criteria may be used to determine which equivalence set to use. In one example, the equivalence set in which the most hosts are placed may be selected. Also, other factors may be used, such as the largest equivalence set with the most available resources in which all hosts can be placed may be selected.

At 520, host assignment manager 104 places virtual machines 108a-d in collection 110 on hosts 106 in the selected equivalence set. For example, a primary virtual machine 108a is placed on a first host 106. Then, a second virtual machine 108b is placed on a second host 106. Other virtual machines 10c-d, if applicable, may be placed on third, fourth, etc. hosts 106.

The following illustrates pseudocode for placing virtual machines 108a-d in collection 110 in an equivalence set according to one embodiment.

```
MaxPlacedSet = NULL
MaxPlacedNum = 0
For each equivalence set Sij
    Invoke a placement engine with virtual machines (VMs) 108a-d in
    collection 110, and additional constraints, and the set of hosts
    in the equivalence set. Seek to place as many of the VMs in the
    set given the set of hosts and the other constraints such as VM
    to VM and resource reservations.
    Record whether a place was found for each of the VMs using set Sij
    If a host was not found for all VMs in the set
        If number of VMs placed > MaxPlacedNum
            MaxPlacedNum = number of VMs placed using set Sij
            MaxPlacedSet = set Sij
            MaxSetVmPlacement = placements of each VM in the collection
        End if
    Else
        Exit - no more work to do
    End if
End for // each set
If no set was found that allows all VMs to be placed
    For each VM in MaxSetVmPlacement
        If VM was not placed in set MaxPlaceSet
            Log one or more reasons why the VM could not placed
        End if
    End for
End if
```

Figure 6:
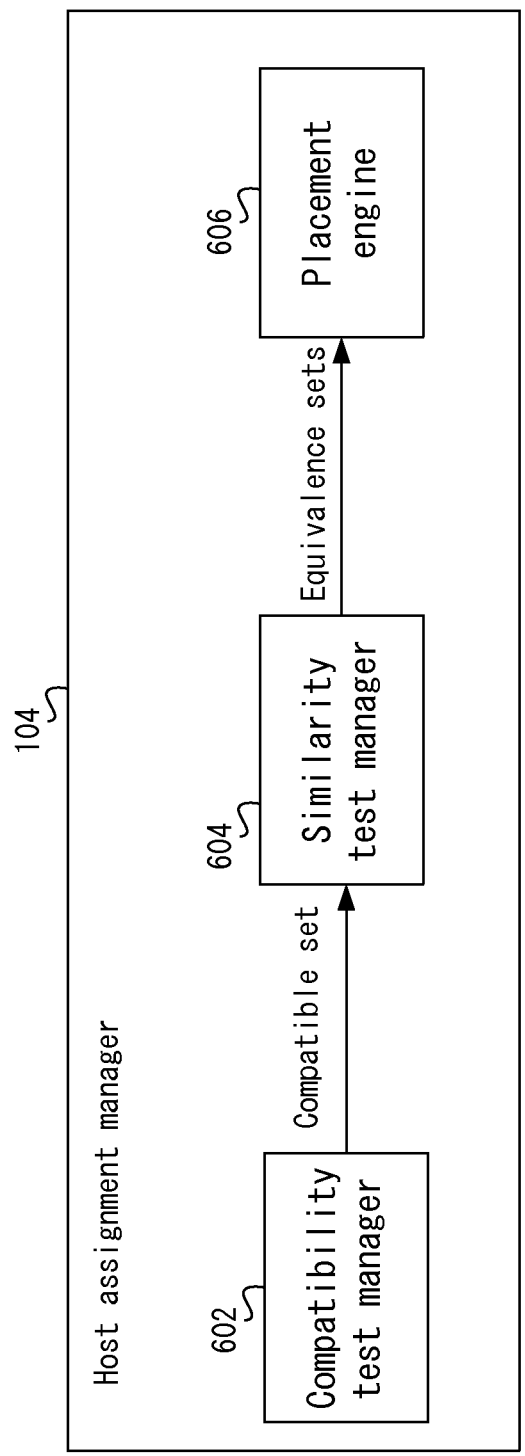
FIG. 6 depicts a more detailed example of host assignment manager according to one embodiment.

FIG. 6 depicts a more detailed example of host assignment manager 104 according to one embodiment. Host assignment manager 104 includes a compatibility test manager 602, a similarity test manager 604, and a placement engine 606.

Compatibility test manager 602 receives constraints for virtual machines 108a-d in collection 110 and attributes for the full set of hosts 106. The attributes may include information for computing resources included in hosts 106. Compatibility test manager 602 then determines a compatible set of hosts based on the constraints and attributes of hosts 106.

Similarity test manager 604 receives the compatible set of hosts and tests similarity among the hosts 106 in the compatible set. For example, similarity test manager 604 determines a number of equivalence sets based on constraints for virtual machines 108a-d in collection 110 and attributes for hosts 106 in the compatible set.

Placement engine 606 then selects one equivalence set for placing virtual machines 108a-d in collection 110. Placement engine 606 then attempts to place virtual machines 108a-d in collection 110 on host 106 in the selected equivalence set. Placement engine 606 may use a policy that takes into account constraints for virtual machines 108a-d in collection 110 and attributes for the full set of hosts 106. Other factors may be used, such as information about a state of hosts 106 in the equivalence set. For example, available computing resource load, which virtual machines 108e-x are running on hosts 106, and other non-real-time or real-time information may be used.

In one embodiment, placement engine 606 may stop testing equivalence sets when an acceptable equivalence set is determined. For example, if an equivalence set that can accommodate all virtual machines 108a-d in collection 110 is determined, then the testing for an acceptable equivalence set is stopped. This may avoid unnecessary testing when an acceptable equivalence set has been found.

After testing is performed and an equivalence set is selected, placement engine 606 places virtual machines 108a-d in collection 110 on hosts 106. For example, as many virtual machines 108a-d in collection 110 may be placed on hosts 106 in the equivalence set according to the policy.

Figure 7:
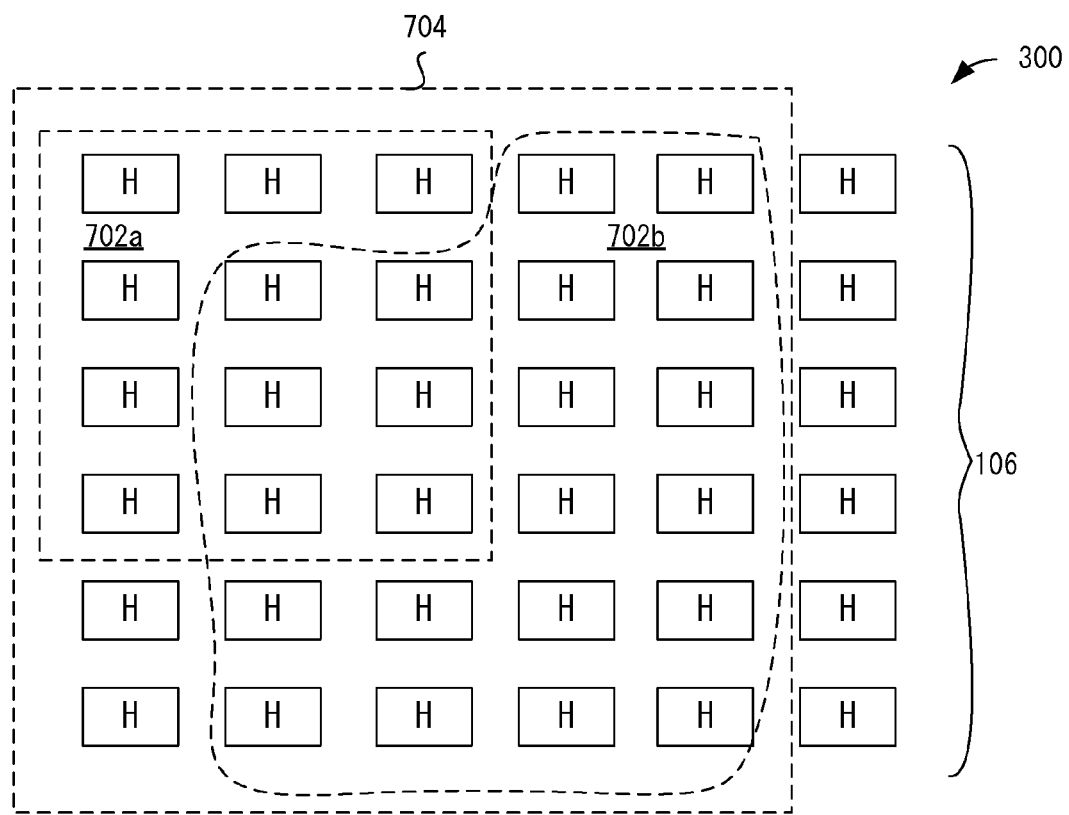
FIG. 7 shows an example of a full set of hosts for taking a union of compatible sets.

In one embodiment, in the compatibility evaluation, a union of various compatible sets of hosts 106 may be used. For example, FIG. 7 shows an example of a full set of hosts 106 at 300. Multiple compatible sets at 702a and 702b may be determined. The first compatible set at 702a may be determined based on a first virtual machine 108a in collection 110 and the second compatible set at 702b may be determined based on a second virtual machine 108b in collection 110. The union of compatible sets 702a and 702b may then be taken. For example, a compatible set taking the union of compatible sets at 702a and 702b is shown at 704. In this case, all hosts 106 from the first compatible set at 702a and the second compatible set at 702b are included in the final compatible set.

The final compatible set may include hosts 106 that may not be compatible with all virtual machines 108a-d in collection 110. During placement, a host 106 in which some of virtual machines 108a-d are not compatible may be excluded from the placement. Thus, in an equivalence set, only the compatible hosts 106 are used. In this case, the compatibility evaluation is deferred. This may allow all virtual machines 108a-d in collection 110 to be placed even though all virtual machines 108a-d in collection 110are not compatible with all hosts 106 in a given equivalence set. When the compatibility is deferred, the incompatible hosts 106 for one of virtual machines 108a-d are excluded by placement engine 606.

In one embodiment, particular embodiments use approach of precomputing the equivalence sets if the number of equivalence sets is reasonably bounded. This may be determined automatically or a user may determine whether the policy being used would be acceptable for precomputing of equivalence sets. For example, a state space is more constrained for tests that do not provide any branching, that is, a test that requires all hosts 106 to have a processing speed within N MHz of each other will yield at most M equivalence sets, where M is the number of hosts 106. However, a test that that requires either the processing speeds to be within M MHz or the number of processing cores to be within a constant V may yield a much larger search space.

When the search space is determined to be too great, a different algorithm than described above may be used. For example, the equivalence set is enumerated in a computationally less efficient way if the attributes of host 106 do not satisfy transitivity and/or symmetry properties. Host assignment manager 104 selects each virtual machine 108 in collection 110 in turn, and then uses the similarity test to select a host that this virtual machine 108 can be possibly placed on assuming the previously selected virtual machines 108 are placed in the partial host set host assignment manager 104 has selected so far. Then this selected host 106 is added to the partial host set. After all virtual machines 108a-d in collection 110 are selected, the resulting host set constitutes an equivalence set. The procedure can be iterated and in every iteration the procedure selects different hosts 106 for a given virtual machine 108a-d. This procedure is feasible when the number of virtual machine 108a-d in collection 110 is relatively small (for example when there are only two virtual machines 108a and 108b to be placed for a fault tolerance policy), but could be computationally infeasible otherwise.

Accordingly, particular embodiments place virtual machines 108a-d in collection 110 after determining an equivalence set in which to place virtual machines 108a-d in collection 110. That is, the equivalence set of hosts 106 in which virtual machines 108a-d in collection 110 might be placed is determined before a single virtual machines 108a-d in collection 110 is placed on one of the hosts 106.

The various embodiments described herein may employ various computer-implemented operations involving data stored in computer systems. For example, these operations may require physical manipulation of physical quantities--usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method for placing virtual machines in a collection, the method comprising:

determining, by a computing device, a compatible set of hosts prior to placing virtual machines in the collection, wherein the compatible set is determined on the basis of the compatibility of types of resources in the host with the virtual machines in the collection;

determining, by the computing device, a plurality of equivalence sets of hosts from the compatible set of hosts prior to placing virtual machines in the collection, wherein hosts in an equivalence set of hosts are considered similar;

testing equivalence sets of hosts in the plurality of equivalence sets of hosts, wherein a test of an equivalence set of hosts determines a number of virtual machines in the collection that can be placed on hosts in the equivalence set of hosts;

ranking the tested equivalence sets of hosts, wherein the ranking is based on the testing; and selecting an equivalence set of hosts from the ranked equivalence sets of hosts in which to place the virtual machines in the collection based on the rankings; and placing at least a portion of the virtual machines in the collection on one or more hosts in the selected equivalence set of hosts.

2. The method of claim 1, wherein the compatibility of types of resources in the host with virtual machines in the collection is determined by whether virtual machines in the collection are compatible with at least one of the architecture of the host device and the file system of the host device.

3. The method of claim 1, wherein determining the plurality of equivalence sets of hosts comprises using a symmetry property to determine the plurality of equivalence sets of hosts.

4. The method of claim 3, wherein using the symmetry property comprises:
evaluating whether a first host that has a virtual machine assumed to be placed on the first host is similar to a second host; and
if the second host is similar, using the symmetry property to evaluate similarity of other hosts.

5. The method of claim 1, wherein determining the plurality of equivalence sets of hosts comprises using a transitivity property to determine the plurality of equivalence sets of hosts.

6. The method of claim 5, wherein using the transitivity property comprises:
evaluating whether a first host that has a virtual machine assumed to be placed on the first host is similar to a second host and a third host; and
if the second host and the third host are similar, using the transitivity property to evaluate similarity of other hosts.

7. The method of claim 1, wherein the testing of the at least a portion of the plurality of equivalence sets of hosts is stopped after a placement of virtual machines in the collection on hosts in one of the plurality of equivalence sets of hosts meets a placement criterion.

8. The method of claim 1, further comprising:
determining constraints for the virtual machines in the collection, wherein the constraints are based on a policy used for placing the virtual machines in the collection;
determining attributes for a set of hosts; and
determining the plurality of equivalence sets of hosts based on the constraints and the attributes.

9. The method of claim 1, further comprising:
determining a plurality of preliminary compatible sets that are compatible with a plurality of virtual machines in the collection; and
taking a union of the plurality of preliminary compatible sets to determine a final compatible set of hosts, wherein the plurality of preliminary equivalence sets of hosts are determined from the final compatible set.

10. The method of claim 1, wherein placing at least a portion of the virtual machines in the collection is based on a policy, the policy including constraints used to determine the plurality of equivalence sets of hosts.

11. The method of claim 1, wherein placing at least a portion of the virtual machines in the collection comprises:
placing a first virtual machine on a first host in the selected equivalence set of hosts; and
placing a second virtual machine on a second host in the selected equivalence set of hosts, the second host being different from the first host.

12. The method of claim 1, wherein the compatibility of each host in the compatible set of hosts is determined independent of available physical resources on a host for hosting the virtual machines in the collection.

13. A non-transitory computer-readable storage medium containing instructions for placing virtual machines in a collection, the instructions for controlling a computer system to be operable to:
determine a compatible set of hosts prior to placing virtual machines in the collection, wherein the compatible set of hosts is determined on the basis of the compatibility of types of resources in the host with the virtual machines in the collection;
determine a plurality of equivalence sets of hosts from the compatible set of hosts prior to placing virtual machines in the collection, wherein hosts in an equivalence set of hosts are considered similar;
test equivalence sets of hosts in the plurality of equivalence sets of hosts, wherein a test of an equivalence set of hosts determines a number of virtual machines in the collection that can be placed on hosts in the equivalence set of hosts;
rank the tested equivalence set of hosts, wherein the ranking is based on the testing;
select an equivalence set of hosts from the ranked equivalence set of hosts in which to place the virtual machines in the collection based on the rankings; and
place at least a portion of the virtual machines in the collection on one or more hosts in the selected equivalence set of hosts.

14. The computer-readable storage medium of claim 13, wherein operable to determine the plurality of equivalence sets of hosts comprises being operable to use a symmetry property or a transitivity property to determine the plurality of equivalence sets of hosts.

15. The computer-readable storage medium of claim 13, further operable to:
test at least a portion of the plurality of equivalence sets of hosts, wherein a test of an equivalence set of hosts determines if the virtual machines in the collection can be placed on hosts in the equivalence set of hosts; and
select an equivalence set of hosts based on the testing.

16. The computer-readable storage medium of claim 13, wherein being operable to place at least a portion of the virtual machines in the collection is based on a policy, the policy including constraints used to determine the plurality of equivalence sets of hosts.

17. A method for placing virtual machines in a collection, the method comprising:
determining, by a computing device, a compatible set of hosts prior to placing virtual machines in the collection, wherein the compatible set is determined on the basis of the compatibility of types of resources in the host with virtual machines in the collection;

determining, by the computing device, a plurality of equivalence sets of hosts from the compatible set of hosts prior to placing virtual machines in the collection, wherein hosts in an equivalence set of hosts are considered similar;

selecting an equivalence set of hosts in the plurality of equivalence sets to place the virtual machines in the collection; and placing at least a portion of the virtual machines in the collection on one or more hosts in the selected equivalence set of hosts;

wherein determining the plurality of equivalence sets of hosts comprises using a symmetry property to determine the plurality of equivalence sets of hosts by:

evaluating whether a first host that has a virtual machine assumed to be placed on the first host is similar to a second host; and if the second host is similar, using the symmetry property to evaluate similarity of other hosts.

18. A method for placing virtual machines in a collection, the method comprising:

determining, by a computing device, a compatible set of hosts prior to placing virtual machines in the collection, wherein the compatible set is determined on the basis of the compatibility of types of resources in the host with virtual machines in the collection;

determining, by the computing device, a plurality of equivalence sets of hosts from the compatible set of hosts prior to placing virtual machines in the collection, wherein hosts in an equivalence set of hosts are considered similar;

selecting an equivalence set of hosts in the plurality of equivalence sets to place the virtual machines in the collection; and placing at least a portion of the virtual machines in the collection on one or more hosts in the selected equivalence set of hosts;

wherein determining the plurality of equivalence sets of hosts comprises using a transitivity property to determine the plurality of equivalence sets of hosts by:

evaluating whether a first host that has a virtual machine assumed to be placed on the first host is similar to a second host and a third host; and if the second host and the third host are similar, using the transitivity property to evaluate similarity of other hosts.

* * * * *